No. 692,046. Patented Jan. 28, 1902.
R. BISCHOFF.
BRAKE FOR STREET CARS.
(Application filed Nov. 29, 1901.)
(No Model.) 2 Sheets—Sheet 1.

WITNESSES:
Joseph H. Niles.
Karl Kaelble

INVENTOR
Richard Bischoff,
BY
Grauer Wahle
ATTORNEYS

THE NORRIS PETERS CO., PHOTO-LITHO., WASHINGTON, D. C.

No. 692,046. Patented Jan. 28, 1902.
R. BISCHOFF.
BRAKE FOR STREET CARS.
(Application filed Nov. 29, 1901.)
(No Model.) 2 Sheets—Sheet 2.
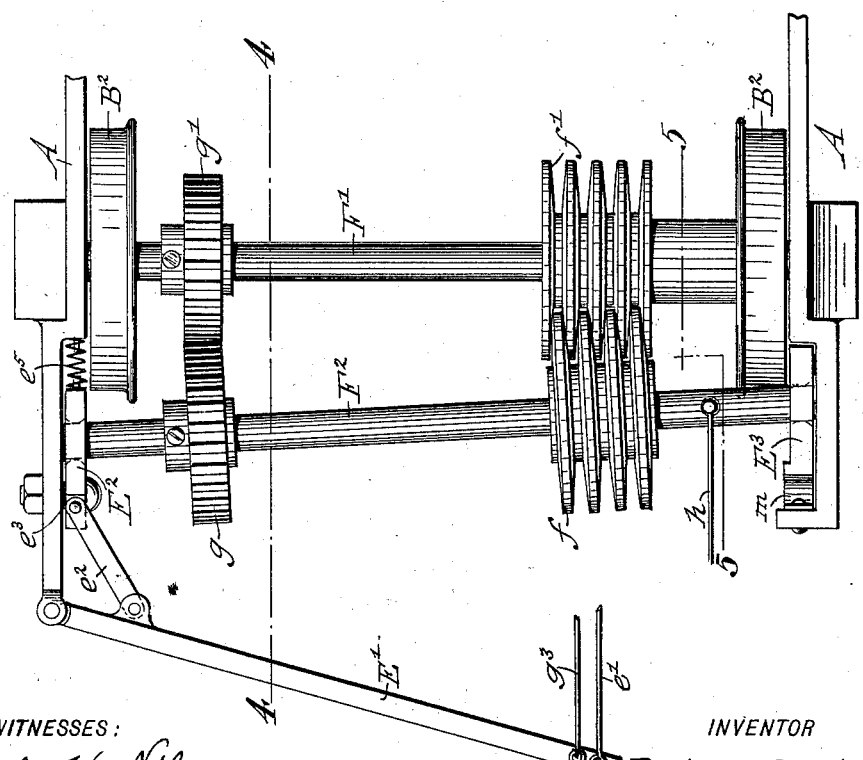
WITNESSES:
Joseph H. Niles.
Karl Kaeble.
INVENTOR
Richard Bischoff,
BY
Jacques Wahle
ATTORNEYS

UNITED STATES PATENT OFFICE.

RICHARD BISCHOFF, OF NEW YORK, N. Y.

BRAKE FOR STREET-CARS.

SPECIFICATION forming part of Letters Patent No. 692,046, dated January 28, 1902.

Application filed November 29, 1901. Serial No. 84,029. (No model.)

*To all whom it may concern:*

Be it known that I, RICHARD BISCHOFF, a citizen of the United States, residing in New York, borough of Manhattan, and State of New York, have invented certain new and useful Improvements in Brakes for Street-Cars, of which the following is a specification.

This invention relates to certain improvements in brakes for street-cars in which, in addition to the ordinary brake, an auxiliary or emergency brake is employed which when used in addition to the ordinary brake will enable the car to be stopped in a quick and effective manner within a very short time and distance; and for this purpose the invention consists in the combination, with the ordinary brake-shoes and operating mechanism, of an auxiliary or emergency brake that is thrown into action by a separate lever mechanism, said emergency-brake consisting of an auxiliary shaft that is thrown into mesh with the shaft of the truck-wheels, so as to produce an auxiliary brake action on the axle of the small truck-wheels in addition to the ordinary brake action on the larger wheels of the truck; and the invention consists, further, of certain details of construction and combinations of parts, which will be fully described hereinafter and finally pointed out in the claims.

Figure 1:
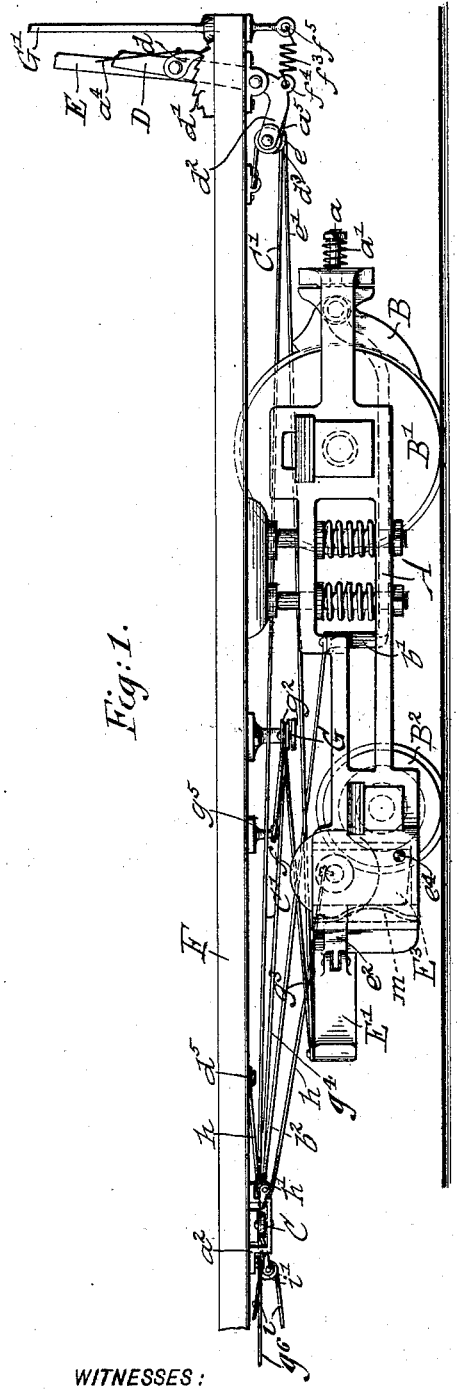
Figure 2:
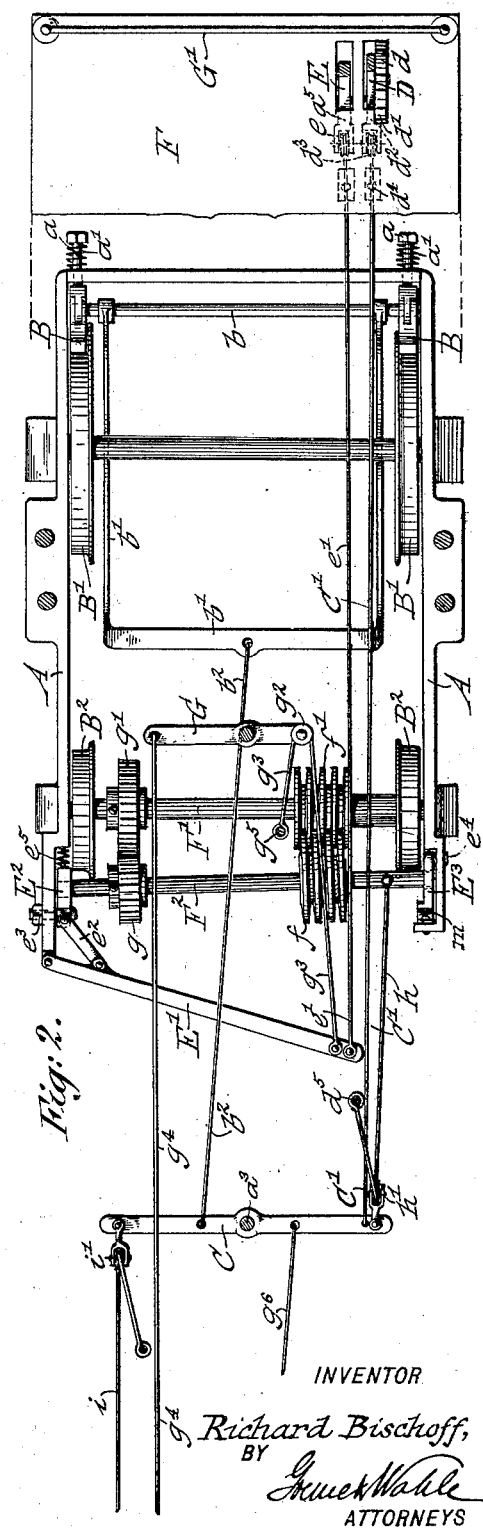

In the accompanying drawings, Figure 1 represents a side elevation of my improved brake for street-cars, showing the same applied to one of the trucks of a car. Fig. 2 is a plan view of Fig. 1 with part of the bottom of the car removed. Fig. 3 is a plan view of the principal parts of the auxiliary or emergency brake drawn on a larger scale. Fig. 4 is a vertical transverse section on line 4 4, Fig. 3, showing the intermeshing gear of the emergency-brake; and Fig. 5 is a vertical transverse section on line 5 5, Fig. 3.

Similar letters of reference indicate corresponding parts.

Referring to the drawings, A represents the frame of the truck to which my improved brake is applied. Through the frame A pass spring-actuated supporting-rods $a\, a$, to which are pivoted brake-shoes B B, retained normally out of contact with the large wheels B' B' of the truck by the action of the springs $a'\, a'$ of said rods $a\, a$. The brake-shoes are connected across the frame by a brake-beam $b$, to which is attached a U-shaped draw-frame $b'$, which is connected by a wire rope or suitable chain $b^2$ with a lever C, fulcrumed in a suitable bracket $a^2$, secured to the platform F of the car. One end of the lever C is connected by a rope or chain C' with an operating-lever D, which is provided with the usual pawl $d$, engaging the teeth of a stationary ratchet $d'$, said lever being provided with a curved end $d^2$ below the platform F, as shown in Fig. 1, which curved end carries a pulley $d^3$, over which the connecting rope or chain C' passes. The end of the chain C' is attached permanently at any suitable point, as $d^4$, to the platform F of the car. The brake is operated by pulling back the lever D, whereby the lever C is turned on its fulcrum $a^3$, so that the chain $b^2$ and frame $b'$ are drawn and the brake-shoes applied to the truck-wheels. The pawl $d$ of the brake-lever D is connected by a rod $a^4$ with the handle of the same, (not shown,) so as to be readily withdrawn from the teeth of the ratchet $d'$ when the brakes are to be released. The return motion of the brakes when released is effected by the springs $a'\, a'$. The brake mechanism thus far described is well known and forms no part of my present invention.

To the car-platform F, preferably adjacent the lever D, is pivoted a second lever E, which likewise has a curved lower end $a^5$ and is provided with a pulley $e$, over which passes a rope or chain $e'$, connected to one end of a lever E', which is pivoted at its opposite end to one side of the truck-frame A. The lever E' is connected by a pivot-link $e^2$ with a block $E^2$, pivoted to the frame at $e^3$ and forming a journal-bearing for one end of an auxiliary shaft $F^2$, that is arranged, preferably, adjacent the shaft F' of the second or smaller pair of truck-wheels $B^2$. Upon the shaft $F^2$ is fixed a gear-wheel $g$, adapted to mesh with a gear-wheel $g'$ on the shaft F'. The opposite end of the shaft $F^2$ is supported in a block $E^3$, pivoted at $e^4$ to the opposite side of the truck-frame A. Upon the shaft $F^2$ is fixed a friction-gear $f$, adapted to mesh with a corresponding friction-gear $f'$ on the shaft F'. To the shaft $F^2$ is connected by any suitable means a wire rope $h$, which passes over a pulley $h'$, applied to the fulcrumed lever C, and is connected at any suitable point, as $d^5$, to the car-platform.

The friction and toothed gears $f\ g$ are normally retained out of mesh with the gears $f'\ g'$ by any suitable means, such as by pivoting the supporting-blocks, as shown in the case of the block $E^3$, below the shaft $F^2$ and between the center of gravity thereof and the shaft $F'$, so that the block tends to swing to carry the shaft $F^2$ away from the shaft $F'$, or by means of a spring, as $e^5$, operating against the block $E^2$, or any other suitable device. Outward movement of the block $E^2$ is limited by abutment of the operating-lever E against the dashboard $G'$ or against any suitable stop provided for the purpose, and like movement of the block $E^3$ is limited by any suitable stop on the truck-frame A, but preferably by a spring $m$, secured to the frame A, said spring yielding in case of entrance between the gears of stone or other body separating the same more than normal distance apart. The improved brake, as described, is complete as to one truck.

Upon drawing back the operating-lever E the rope $e'$ is pulled, lever $E'$ operated, and through link $e^2$ the block $E^2$ moved against tension of spring $e^5$, thereby shifting one end of shaft $F^2$ toward shaft $F'$. This movement suffices to bring the friction-gears into contact, but not the gears $g\ g'$ into mesh. The friction causes the turning of shaft $F^2$, whereby rope $h$ is wound on the same, drawing lever C, and thereby rope $b^2$ and frame $b'$, and causing application of the shoes B B to the wheels $B'\ B'$. The movement of lever C causes slack in the rope $C'$. This is taken up progressively with the operation of the lever E by means of the ordinary brake-lever D under the actuation of a spring $f^3$, said spring being located at any suitable point—as, for example, between an eye $f^4$ on lever D and an eye $f^5$ attached to the platform F. The pawl $d$ operates and locks lever D against return movement, thereby retaining the rope $C'$ taut and the brakes applied even, though the lever E be permitted now to return to non-braking position. In case this is done spring $e^5$ returns lever $E'$ and rope $e'$ does not become slack. The advantage is obtained that it is possible to apply the brakes much more powerfully through the auxiliary mechanism than by direct hand operation of the lever D, which latter is sufficient, however, for the usual stoppages. The momentum of the car acting through the gears to wind the rope $h$ on axle $F^2$ produces a more powerful application of the brake-shoes. For releasing the brake the pawl is disengaged from the ratchet $d'$.

The operation described is that which occurs when the lever E is pulled only so as to cause engagement of the friction-gears $f\ f'$. In case of extreme danger, however, a still more powerful application of the brakes and one constantly increasing in strength may be effected by simply pulling the lever E still further. The shafts $F'\ F^2$ and their gears are so positioned that this further movement causes intermeshing of the toothed gears $g\ g'$, whereby the rotary motion of the wheel-shaft $F'$ is transmitted positively and not slidably, as with friction-gears, to the brake-shaft $F^2$. Winding of rope $h$ will continue as long as the gears are in mesh and rotation of the wheel-shaft continues. The gears may be thrown out of mesh at any instant by releasing the lever E, lever D retaining the brakes applied with full force until release of the same by withdrawing the pawl $d$ from the ratchet $d'$.

The second truck of the car is provided with similar brakes, which are connected with the actuating-levers C and $E'$, the auxiliary brake-lever with the opposite end of the fulcrumed lever C by means of a corresponding rope $i$ and sheave $i'$, while the lever corresponding to $E'$ is connected by a rope $g^4$ with lever G, fulcrumed to the under side of the platform F and having at one end a pulley $g^2$, over which a rope $g^3$, connected with the lever $E'$ shown, is passed, said rope being attached to a keeper or eye $g^5$ at the under side of the bottom frame F, as shown in Figs. 1 and 2. Lever C is connected by a rope $g^6$ with a draw-frame corresponding to $b'$. Both the ordinary and auxiliary brakes of the second truck are actuated thereby conjointly with the ordinary and auxiliary brakes of the first truck and a very strong and powerful brake action exerted on all the truck-wheels of the car.

Having thus described my invention, I claim as new and desire to secure by Letters Patent—

1. The combination of an ordinary brake mechanism applied to one pair of truck-wheels, an auxiliary or emergency brake mechanism applied to the second pair of truck-wheels, actuating mechanism for the auxiliary brake mechanism, and actuating mechanism connecting said auxiliary mechanism with the ordinary brake mechanism so as to call both ordinary and auxiliary brake mechanisms simultaneously into action, substantially as set forth.

2. The combination of brake-shoes, actuating mechanism for the same, and an auxiliary or emergency brake, consisting of an auxiliary shaft adjacent the second pair of truck-wheels, actuating lever mechanism for moving said auxiliary shaft, gear-wheels on the auxiliary and truck-wheel shafts, friction-gears on said shafts, and means for connecting said auxiliary shaft with the actuating mechanism of the brake-shoes so as to call the same into action simultaneously with the emergency brake mechanism, substantially as set forth.

3. In a brake for cars, the combination, with the shaft of one pair of truck-wheels, of an auxiliary shaft, spring-cushioned blocks for supporting said auxiliary shaft, lever mechanism actuating the same, intermeshing gear-wheels secured to the truck-wheel and auxiliary shafts, intermeshing friction-gears secured to the said shafts, and lever mechanism for actuating the auxiliary brake mechanism from the platform of the car, substantially as set forth.

In testimony that I claim the foregoing as my invention I have signed my name in presence of two subscribing witnesses.

RICHARD BISCHOFF.

Witnesses:
PAUL GOEPEL,
JOSEPH H. NILES.